United States Patent [19]
von Arndt et al.

[11] Patent Number: 5,679,838
[45] Date of Patent: Oct. 21, 1997

[54] PREVENTION OF OR REDUCTION IN THE FORMATION OF AMINES AND N-NITROSAMINES DURING THE MANUFACTURE AND USE OF ELASTOMERS

[75] Inventors: Ernst-Moritz von Arndt, Weinheim; Günter Stein, Hemsbach, both of Germany

[73] Assignee: Firma Carl Freudenberg, Weinheim, Germany

[21] Appl. No.: 598,596

[22] Filed: Feb. 12, 1996

[30] Foreign Application Priority Data

Feb. 18, 1995 [DE] Germany .............. 195 05 649.3

[51] Int. Cl.$^6$ .............................................. C07C 249/00
[52] U.S. Cl. ................................ 560/332; 564/2; 252/405
[58] Field of Search ........................ 560/332; 564/2; 524/196; 252/405

[56] References Cited

FOREIGN PATENT DOCUMENTS 895 526  11/1953  Germany .
40 20 059 A1  1/1992  Germany ............ C08L 21/00
02060949  1/1990  Japan .

OTHER PUBLICATIONS

Lheureux, M. et al., "Nitrosamines in Rubber Vulcanizate: An Evaluation of Specific Inhibitors," pp. 107–113, (Feb. 1990).

"Abbreviations of chemicals and polymers in the rubber–and plastics industry," *Abkürzungen für Chemikalien und Polymere in der Gummi–und Kunststoffindustrie*. Rhein–Chemie, 1979.

*Primary Examiner*—Samuel Barts
*Attorney, Agent, or Firm*—Kenyon & Kenyon

[57] ABSTRACT

Monofunctional or multifunctional isocyanates having the general formula $$R-(N=C=O)_x$$

where R is any organic remainder, $x \geq 1$, or compounds which form such isocyanates under the influence of temperature are used in elastomeric compounds to be vulcanized as inhibitors for amines.

12 Claims, 2 Drawing Sheets

1

PREVENTION OF OR REDUCTION IN THE FORMATION OF AMINES AND N-NITROSAMINES DURING THE MANUFACTURE AND USE OF ELASTOMERS

BACKGROUND OF THE INVENTION

1. Field of the Invention

The invention relates to the prevention or reduction of amine and N-nitrosamine formation during the production and use of elastomers.

2. Description of Related Art

Volatile N-nitrosamines can be released to the environment from elastomeric articles. These N-nitrosamines can be formed from caoutchouc chemicals (for example activators, accelerators, sulphur donors and retarders) which contain amines in the combined state. Likewise, N-nitrosamines already form during the processing of caoutchouc compounds. In the formation of these compounds, both $NO_x$ (for example adsorbed on elastomeric constituents or from the surrounding air) and the corresponding secondary amines are involved.

The nitrosamine problem has been known in the rubber industry for many years. The pressure to eliminate carcinogenic N-nitrosamines is being intensified by laws pertaining to maximum concentrations.

In Kautschuk + Gummi Kunststoffe [Caoutchouc + Rubber Plastics], Vol. 43 (1990), No. 2, pp. 107–113, the use of inhibitors is examined to bond the critical secondary amines. In particular, tests with oxime-blocked isocyanates to inhibit methyl phenylamine from dimethyl diphenyl thiuram disulphide resulted in no reduction in the NMPhA quantity being liberated. Therefore this method is regarded by the authors as ineffective in the case of a dose of blocked isocyanate customary for elastomers.

SUMMARY OF THE INVENTION

An object of the present invention is to specify chemical compounds, hereinafter called amine-inhibitors, whose use results in the blocking of amines forming toxic nitrosamines not only during vulcanization, but also during storage, assembly and installation of the elastomeric material.

A further object of the invention is the prevention of or marked reduction in the formation of N-nitrosamines during the manufacture and use of elastomers. A further object of the invention is the prevention of or marked reduction in the outgassing of free amines typically formed during the manufacture, storage, transport or installation of the elastomeric parts, as well as in their assembled condition, and consequently the prevention of the subsequent formation of corresponding N-nitrosamines. Yet a further object of the invention is the simultaneous retention of, or at least only slight impairment of the mechanical-technological properties, the compression set, as well as the durability and functional properties of the vulcanized products in each case. Another object of the invention is the prevention of or reduction in blooms on the surface of the vulcanized products produced by reaction products from the cross-linking [vulcanization] reactions.

These and other objects of the invention are achieved by the use of monofunctional or multifunctional isocyanates in elastomers to be vulcanized as amine inhibitors. The isocyanates used have the formula $R\text{---}(N\text{=}C\text{=}O)_x$, where R is any organic remainder and $x \geq 1$.

DETAILED DESCRIPTION OF THE INVENTION

Figure 1B:
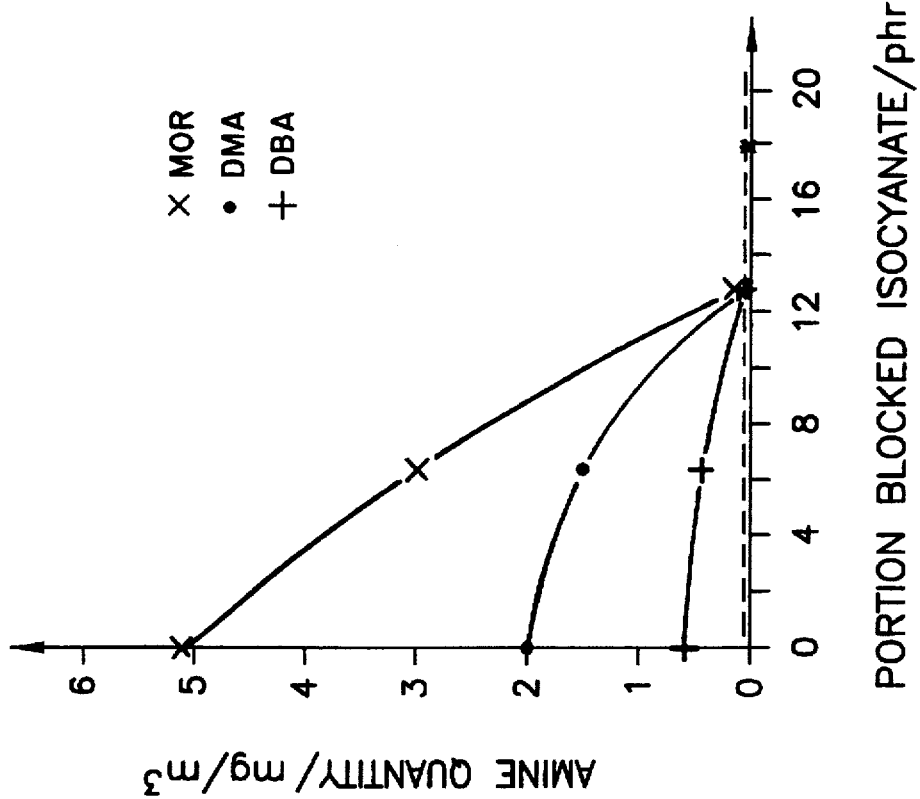
FIG. 1 graphically depicts the dependence of the quantities of free amines in the press vapor on the quantity of amine inhibitor used (IDPI) for Example 3, where the dotted line indicates the detection limit (<0.1 mg/m₃).

The invention is based on the use of monofunctional or multifunctional isocyanates having the general formula

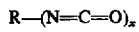

where R is any organic remainder; $x \geq 1$, in elastomeric compounds to be vulcanized as inhibitors for the amines.

In another embodiment, compounds are used which first under vulcanization conditions release chemical substances having functional isocyanate groups as amine inhibitors, for example, urea derivatives or compounds designated as "blocked isocyanates". Their advantage consists in the fact that, compared with free isocyanates, they show a better resistance to hydrolysis and they influence the vulcanization characteristics of the elastomeric compounds less. This embodiment is also advantageous because of the availability of numerous starting materials.

In this connection, the blocking of the isocyanate groups is possible due to conversion with active compounds containing hydrogen, represented schematically as:

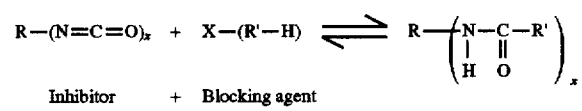

Inhibitor    +    Blocking agent where R and R' are any organic remainder and $x \geq 1$.

In the use of compounds which, under vulcanization conditions, release chemical substances having functional isocyanate groups as amine inhibitors, it must be taken into consideration that the reactivity of the blocking agent R'—H with respect to the isocyanate is less than the corresponding reactivity of the amines to be inhibited. Relevant information with regard to the variation in the reactivity of these compound classes is inferable from the literature in the art.

If primary amines are used for the chemical blocking of the isocyanates and they are released during the splitting under vulcanization conditions, in the event of a possible nitrosation, they will compete with the secondary amines to be inhibited from the elastomeric compound. Because of the mostly higher reactivity of the primary amines with respect to $NO_x$, preferably their harmless nitrosation products will form. Instead of the primary amines, ammonia can also form which, in the same way, will compete with the secondary amines.

Moreover, the blocking of the reactive NCO groups is also possible with the formation of dimeric, oligomeric or polymeric isocyanates.

In doing this, preferably compounds are used that have uretdione structures which, simplified, would be formed according to the equation

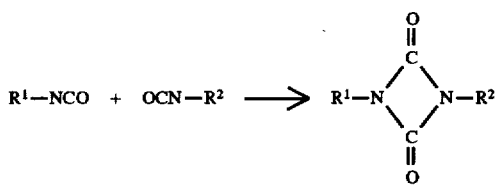

with R¹ and R² representing any organic remainders. Both blocking methods can also be combined within the framework of the invention.

The dosage of the amine inhibitor selected is determined according to its number of active or activable NCO groups and according to the quantity of amines released under vulcanization conditions. In so doing, one will mostly choose a dosage stoichiometric to the theoretically highest possible quantity of amines capable of being released. Because of the increase in concentration, the selection of a hyperstoichiometric isocyanate (-donor)-dosage results in accelerated inhibiting of the amines. In contrast to that, hypostoichiometric dosages can result in only partial inhibiting of the amines which, for example, can be expedient for economic reasons.

If constituents are contained in the rubber compound which, in competition with the amines to be inhibited, can likewise react with isocyanates, the isocyanate or the isocyanate donor should be dosed correspondingly higher in order to unfold its full effectiveness. Such constituents can be, for example, alcohols, phenols or amines.

Because of its functional —SH-group, mercaptobenzthiazole can also react with isothiocyanates. Therefore, with the invention, it is also possible to effectively block this toxic elastomeric constituent as well.

Due to the chemical bonding of the amines, other reaction products are formed during vulcanization in comparison with the materials without amine-inhibitor-additive. Because of the different molecule size and solubility of these substances in the elastomeric matrix, corresponding blooms on the surface of the vulcanized product are totally or partially suppressed.

A detailed insight into the effectiveness of the amine inhibitors and their influence on the mechanical-technological and other important properties of the elastomeric vulcanized products is given in the following examples.

EXAMPLES

Since in all statements concerning effectiveness it is sufficient to differentiate only comparatively between elastomeric materials with and without amine-inhibitor-additive, it was important first and foremost to pay attention to the best possible comparability of the measured values.

In detail, the compound series named in the later examples were subjected to the following tests:

Test Methods and Measuring Principles

A1 Free Amines in the Press Vapor

Suctioning off of air on the vulcanization press in the region of the open vulcanization appliance. Suction power: 500 ml/min; Suction time: 2 h. Adsorption of the amines by means of prepared silica gel in adsorption tubes, desorption with hydrochloric acid, quantitative evaluation after derivatization with dansyl chloride (5-dimethylamino-naphthalene-1-sulphonyl chloride, DNSCl) with HPLC. Data in mg amine/m³ air.

A2 Amines Outgassing from the Vulcanized Product

Reduction of a freshly produced testing plate (200 mm×200 mm×2 mm) into square pieces with an edge length of 5 mm, filling into a gas-washing bottle, passing through of 100 l air with a suction power of 750 ml/min; adsorption of the amines by means of prepared silica gel in adsorption tubes, desorption with hydrochloric acid, quantitative evaluation after derivatization with dansyl chloride (5-dimethylamino-naphthalene-1-sulphonyl chloride, DNSCl) with HPLC. Data in mg amine/m³ air.

NA 1 Nitrosamines in the Press Vapor

Suctioning off of air on the vulcanization press in the region of the open vulcanization appliance. Suction power: 1660 ml/min, Suction time 2 h; Adsorption of the nitrosamines in conventional adsorption tubes suitable for this. Desorption by means of solvent. Gas-chromatographic separation, TEA-detector (thermal energy analyzer) with mass-spectrometric safeguarding. Data in µg N-nitrosamine/ tube NA 2 Nitrosamines in the Vulcanized Product Procedure in conformity with D. C. Havery, T. Fazio; *Food Chem. Toxicol.* 20 (1982) 6, pp. 939–944: Solvent extraction of the vulcanized product, steam distillation of the nitrosamines, solvent extraction of the aqueous distillate, concentration of the organic extract, gas-chromatographic separation, TEA detector with mass-spectrometric safeguarding. Data in mg N-nitrosamine/kg.

The inhibitors named hereafter "blocked isocyanates" are available as commercial products under various brand names.

Preparation of the Compounding Variants

For optimal comparability of results, the following procedure was chosen in the examples specified:

Preparation of a master compounding batch in the closed mixer

Mixing up of the cross-linking substances on a laboratory mill

Division of the batch according to the number of amine inhibitor variants to be tested Mixing in of the respective inhibitor on a laboratory mill. In this manner, variations and influences because of different conditions during the compounding were avoided to the greatest possible extent.

If the melting point of the inhibitor substance was higher than the temperature of about 90° C. reached on the mixing mill, it was necessary to deviate from this procedure. In these cases, the inhibitor was already added in the closed mixer. Moreover, in the case of blocked inhibitors, the temperature in the closed mixer should be above the melting point, but below the splitting temperature.

Nitrile-butadiene caoutchouc (NBR) having an average acrylonitrile content was used substitutionally for the sulphur-vulcanizable, double bond-containing caoutchoucs. At the same time, the same basic formulation was used in all the examples. Sulphur was already added toward the end of the mixing process in the closed mixer for better distribution capability.

Basic formulation (quantity data in phr = parts by weight per 100 parts by weight caoutchouc):

| | |
|---|---|
| Acrylonitrile-butadiene-copolymer, 28% ACN content | 100 |
| Zinc oxide (90%) | 5.5 |
| Stearic acid | 1 |

-continued

| Basic formulation (quantity data in phr = parts by weight per 100 parts by weight caoutchouc): | |
|---|---|
| Zinc salt of 4- and 5-methyl mercaptobenzimidazole | 1 |
| Paraffin wax | 1 |
| Carbon black N 550 | 60 |
| Sulphur | 0.5 |
| Total: | 169 |

Example 1

The following compoundings show the influence of a selection of compounds according to the invention (in the form of dimeric, oligomeric or polymeric isocyanates having uretdione structures) on the vulcanization characteristics and the properties of the vulcanized product in the case of a cross-linking [vulcanizing] system A, consisting of (data in phr)

| TMTD | 1.5 | → | DMA | → | NDMA |
|---|---|---|---|---|---|
| DMPhTD | 1.5 | → | MPhA | → | NMPhA |
| MBS | 1 | → | MOR | → | NMOR |
| DTDM | 1 | → | MOR | → | NMOR | and the corresponding amines or N-nitrosamines resulting therefrom.

Type and quantity (phr) of the amine inhibitors used:

| | Variant | | | | |
|---|---|---|---|---|---|
| Amine inhibitor | A1 | A2 | A3 | A4 | A5 |
| 3,4-dichlorophenyl isocyanate | — | 6.2 | — | — | — |
| IPDI | — | — | 3.7 | — | — |
| MDI | — | — | — | 4.1 | — |
| Blocked isocyanate having uretdione structures (NCO content = 15.3%) | — | — | — | — | 9.3 |

Measuring results obtained during the vulcanization or on the vulcanized products:

| Curemeter Data According to DIN 53 529 (Monsanto MDR 2000 E), T = 180° C.: | | | | | | |
|---|---|---|---|---|---|---|
| Variant | | A1 | A2 | A3 | A4 | A5 |
| Minimum torque | dNm | 1.70 | 1.46 | 1.65 | 1.45 | 1.73 |
| Maximum torque | dNm | 36.1 | 29.2 | 33.3 | 34.8 | 32.5 |
| $t_{s2}$ | min | 0.60 | 0.63 | 0.62 | 0.65 | 0.61 |
| $t_{0.90}$ | min | 1.48 | 1.82 | 1.69 | 2.50 | 1.56 |
| Maximum speed | dNm/min | 44.8 | 28.7 | 35.7 | 21.1 | 42.5 |
| Mechanical-technological Properties | | | | | | |
| Hardness Shore A | | 75 | 73 | 75 | 76 | 76 |
| Stretch value with 100% extension | MPa | 6.7 | 5.8 | 6.7 | 6.0 | 6.8 |
| Tensile strength | MPa | 20.9 | 20.6 | 21.2 | 21.6 | 20.1 |
| Ultimate elongation | % | 282 | 321 | 290 | 328 | 271 |

| Compression Set | | | | | | |
|---|---|---|---|---|---|---|
| 24 h/100° C. 25% Def. | % | 10 | 12 | 12 | 15 | 10 |
| Storage in Hot Air, 3 Days/100° C. | | | | | | |
| Hardness Shore A | | 78 | 76 | 78 | 80 | 79 |
| (Δ Hardness Shore A) | | (+3) | (+3) | (+3) | (+4) | (+3) |
| Tensile strength | MPa | 23.6 | 21.4 | 23.3 | 22.9 | 22.8 |
| (Δ Tensile strength | %) | (+13) | (+4) | (+10) | (+6) | (+9) |
| Ultimate extension | % | 240 | 257 | 249 | 266 | 230 |
| (Δ Ultimate extension | %) | (−15) | (−20) | (−14) | (−19) | (−15) |
| Storage in Hot Air, 14 Days/100° C. | | | | | | |
| Hardness Shore A | | 82 | 82 | 80 | 84 | 81 |
| (Δ Hardness Shore A) | | (+7) | (+9) | (+5) | (+8) | (+5) |
| Tensile strength | MPa | 23.8 | 21.2 | 23.7 | 21.8 | 21.7 |
| (Δ Tensile strength | %) | (+14) | (+3) | (+12) | (+1) | (+8) |
| Ultimate extension | % | 183 | 183 | 194 | 180 | 187 |
| (Δ Ultimate extension | %) | (−35) | (−43) | (−33) | (−45) | (−31) |

Amines Outgassing from the Vulcanized Product (Testing Method A2)

Quantity data in mg amine/$m^3$; in parentheses, the relative portions in percentage in comparison with Variant A1 (without amine inhibitor)

| Variant Amine | A1 | A2 | A3 | A4 | A5 |
|---|---|---|---|---|---|
| DMA | 0.7 | <0.1 | <0.1 | <0.1 | <0.1 |
| MOR | 1.03 | <0.1 | <0.1 | <0.1 | <0.1 |
| MPhA | 15.4 | 10.2 (66) | 12.5 (81) | 11.5 (75) | 12.8 (83) |

Nitrosamines in the Press Vapor (Testing Method NA 1)

Quantity data in μg nitrosamine/tube;
Vulcanization conditions: 185° C./4 min

| Variant Nitrosamine | A1 | A2 | A3 | A4 | A5 |
|---|---|---|---|---|---|
| NDMA | <0.01 | <0.01 | <0.01 | <0.01 | <0.01 |
| NMOR | <0.01 | <0.01 | <0.01 | <0.01 | <0.01 |
| NMPhA | 15.0 | 12.3 | 13.1 | 11.6 | 13.5 |

The following observations can be made from these results:

The amine inhibitors used have no great influence on the vulcanization characteristics. In particular, the prevulcanization time $t_{s2}$, which represents an important criterion for the processing safety of an elastomeric compound, remains practically unchanged. All the inhibitors listed yield a maximum torque which tends to be low; the $t_{0.90}$ times are slightly lengthened with corresponding accompanying reduction in the maximum vulcanization speed.

In comparison with the material without amine inhibitor, the mechanical-technological properties are only insignificantly changed, in part even improved. As required, variations in the Shore hardness or in the stretch value can be corrected by a slight change in the proportion of filler.

The compression set remains the same or is only insignificantly increased.

The resistance to ageing of the vulcanized products, both in the case of 3 days and in the case of 14 days/100° C. is to be regarded as equal within the measuring accuracy.

The quantities of amines released to the surrounding air from the vulcanized products as reaction products of the cross-linking [vulcanizing] chemicals used are markedly reduced in the case of the methyl phenylamine in comparison with the variant without amine inhibitor. In the case of dimethylamine and morpholine, the released amines are even below the detection limit of the analytical determination method used. The analogous is true for the reduction in the quantity of N-nitrosamines emitted during vulcanization.

Since the release of methyl phenylamine or the corresponding N-nitroso methyl phenylamine was only able to be partially suppressed with the inhibitor quantities used, an excess of amine inhibitor was available for the two amines dimethylamine and morpholine because of the stoichiometric dosage of inhibitors relative to the total quantity of releasable amines. To completely reduce the released quantity of methyl phenylamine or the corresponding N-nitrosamine, a marked excess of amine inhibitor(s) is necessary to increase the inhibiting speed, if need be at an even higher vulcanization temperature. For these reasons, in the following Example 2 the use of the accelerator DMPhTD was dispensed with completely.

Example 2

In order to demonstrate the inhibiting effect of the chemicals used that is as comprehensive as possible, work was done with a vulcanization system B that has one or several representatives from the most important accelerator or sulphur donor classes and whose components all are known as suppliers for amines forming carcinogenic N-nitrosamines. This vulcanization system B consisted of (data in phr):

| TMTD | 2   | → | DMA | → | NDMA |
|------|-----|---|-----|---|------|
| ZDMC | 1   | → | DMA | → | NDMA |
| TBTD | 1   | → | DBA | → | NDBA |
| MBS  | 1.5 | → | MOR | → | NMOR |
| DTDM | 1   | → | MOR | → | NMOR |
| OTOS | 1   | → | MOR | → | NMOR |

The following tables show the type and quantity (phr) of the amine inhibitors used as well as the measuring results obtained with the corresponding vulcanized products, specific to the patent claims stated.

| Variant | B1 | B2 | B3 | B4 | B5 | B6 | B7 | B8 |
|---|---|---|---|---|---|---|---|---|
| Amine Inhibitor | | | | | | | | |
| IPDI | — | 5.2 | — | — | — | — | — | — |
| $H_{12}$-MDI | — | — | 6.1 | — | — | — | — | — |
| MDI | — | — | — | 5.8 | — | — | — | — |
| TODI | — | — | — | — | 6.1 | — | — | — |
| Blocked isocyanate (having uretdione structures) NCO content = 15.3% | — | — | — | — | — | 12.8 | — | — |
| Blocked isocyanate NCO content = 15.3% | — | — | — | — | — | - | 12.8 | — |
| Blocked isocyanate (having uretdione structures) NCO content = 17% | — | — | — | — | — | — | — | 11.5 |
| Curemeter Data According to DIN 53 529 (Monsanto MDR 2000 E), T = 180°C. | | | | | | | | |
| Minimum dNm torque | 1.77 | 1.67 | 1.55 | 1.72 | 1.73 | 1.70 | 1.28 | 2.11 |
| Maximum dNm torque | 33.6 | 32.3 | 32.8 | 34.5 | 39.4 | 34.9 | 28.4 | 33.7 |
| $t_{.2}$ min | 0.51 | 0.53 | 0.54 | 0.53 | 0.56 | 0.49 | 0.56 | 0.50 |
| $t_{0.90}$ min | 1.49 | 1.78 | 1.71 | 2.55 | 1.85 | 1.46 | 1.56 | 1.64 |
| Maximum dNm/speed min | 48.5 | 35.4 | 35.6 | 21.1 | 38.1 | 48.4 | 38.4 | 39.3 |
| Mechanical-technological Properties | | | | | | | | |
| Hardness Shore A | 76 | 76 | 75 | 76 | 78 | 76 | 72 | 78 |
| Stretch value with 100% extension MPa | 8.8 | 7.4 | 7.7 | 8.1 | 8.3 | 8.1 | 6.5 | 9.3 |
| Tensile strength MPa | 19.8 | 21.3 | 21.2 | 20.8 | 20.3 | 21.9 | 22.1 | 20.2 |
| Ultimate elongation % | 196 | 248 | 249 | 231 | 226 | 234 | 279 | 204 |
| Compression set | | | | | | | | |

| Variant | B1 | B2 | B3 | B4 | B5 | B6 | B7 | B8 |
|---|---|---|---|---|---|---|---|---|
| 24 h/100°C. % 25% def. | 11 | 17 | 16 | 17 | 17 | 10 | 11 | 13 |
| Storage in Hot Air, 3 Days/100° C. | | | | | | | | |
| Hardness Shore A | 81 | 80 | 81 | 82 | 83 | 81 | 77 | 83 |
| (Δ Hardness Shore A) | (+5) | (+4) | (+6) | (+6) | (+5) | (+5) | (+5) | (+5) |
| Tensile strength MPa | 23.4 | 21.3 | 22.5 | 23.3. | 19.7 | 23.9 | 23.0 | 21.0 |
| (Δ Tensile strength %) | (+18) | (+0) | (+6) | (+12) | (−3) | (+9) | (+4) | (+4) |
| Ultimate elongation % | 168 | 201 | 194 | 196 | 161 | 204 | 226 | 167 |
| (Δ Ultimate elongation %) | (−14) | (−19) | (−22) | (−15) | (−29) | (−13) | (−19) | (−18) |
| Storage in Hot Air, 14 Days/100° C. | | | | | | | | |
| Hardness Shore A | 83 | 84 | 84 | 84 | 84 | 85 | 82 | 85 |
| (Δ Hardness Shore A) | (+7) | (+8) | (+9) | (+8) | (+6) | (+9) | (+10) | (+7) |
| Tensile strength MPa | 22.2 | 19.2 | 20.1 | 18.9 | 20.3 | 22.3 | 21.7 | 17.8 |
| (Δ Tensile strength %) | (+12) | (−10) | (−5) | (−9) | (±0) | (+2) | (−2) | (−12) |
| Ultimate elongation % | 113 | 114 | 122 | 118 | 117 | 129 | 128 | 104 |
| (Δ Ultimate elongation %) | (−42) | (−54) | (−51) | (−49) | (−48) | (−45) | (−54) | (−49) |

Free Amines in the Press Vapor (Testing Method A1)

Quantity data in mg amine/m$^3$; the values stated in parentheses indicate the relative portion in percentage in comparison with the Variant B1 (without amine inhibitor). Vulcanization conditions: 190° C./2 min.

| | Variant | | | | | | | |
|---|---|---|---|---|---|---|---|---|
| Amine | B1 | B2 | B3 | B4 | B5 | B6 | B7 | B8 |
| DMA | 4.42 | 0.32 | 0.21 | 0.36 | 0.43 | 0.19 | 0.26 | 0.52 |
| | | (7.2) | (4.8) | (8.1) | (9.7) | (4.3) | (5.9) | (11.8) |
| MOR | 10.7 | 0.51 | 0.48 | 0.66 | 0.78 | 0.32 | 0.46 | 0.91 |
| | | (4.8) | (4.5) | (6.2) | (7.3) | (3.0) | (4.3) | (8.5) |
| DBA | 1.37 | <0.1 | <0.1 | <0.1 | <0.1 | <0.1 | <0.1 | <0.1 |

Amines Outgassing from the Vulcanized Product (Testing Method A2)

Quantity data in mg amine/m$^3$; the values stated in parentheses indicate the relative portion in percentage in comparison with the Variant B1 (without amine inhibitor). Vulcanization conditions: 190° C./2 min.

| | Variant | | | | | | | |
|---|---|---|---|---|---|---|---|---|
| Amine | B1 | B2 | B3 | B4 | B5 | B6 | B7 | B8 |
| DMA | 11.28 | <0.1 | 0.23 | <0.1 | 0.14 | <0.1 | <0.1 | 0.11 |
| | | | (2.0) | | (1.2) | | | (1.0) |
| MOR | 8.34 | <0.1 | 0.12 | <0.1 | <0.1 | <0.1 | <0.1 | <0.1 |
| | | | (1.4) | | | | | |
| DBA | 0.92 | <0.1 | <0.1 | <0.1 | <0.1 | <0.1 | <0.1 | <0.1 |

Nitrosamines in the Press Vapor (Testing Method NA 1)

Quantity data in μg nitrosamine/tube; Vulcanization conditions: 190° C./2 min

| | Variant | | | | | | | |
|---|---|---|---|---|---|---|---|---|
| Nitrosamine | B1 | B2 | B3 | B4 | B5 | B6 | B7 | B8 |
| NDMA | 0.44 | 0.03 | 0.02 | 0.04 | 0.03 | 0.03 | 0.02 | 0.03 |
| NMOR | 0.98 | 0.05 | 0.03 | 0.06 | 0.02 | 0.05 | 0.04 | 0.03 |
| NDBA | <0.01 | <0.01 | <0.01 | <0.01 | <0.01 | <0.01 | <0.01 | <0.01 |

Nitrosamines in the Vulcanized Product (Testing Method NA 2)

Quantity data in mg/kg; Detection limits: NDMA, NDBA: 0.02 mg/kg; NMOR: 0.05 mg/kg

| | Variant | |
|---|---|---|
| Nitrosamine | B1 | B2 through B8 |
| NDMA | <0.02 | <0.02 |
| NMOR | <0.05 | <0.05 |
| NDBA | 0.06 | <0.02 |

The results listed in the tables show the following:
Just as in the case of the first compound series (A1 through A5), in the case of the compounds B2 through B8 only a slight influence of the amine inhibitor used, the influence being similar according to tendency, results on the vulcanization characteristics.

Likewise, the mechanical-technological properties are only insignificantly altered, in part even improved.

In the case of the free isocyanates used, the compression set is slightly increased. In the case of the blocked systems it remains practically unchanged.

The resistance to aging of the vulcanized products, both in the case of 3 days and in the case of 14 days/100° C., can be regarded as equal within the measuring accuracy. The measured values for the ultimate elongation after storage are higher in the case of some variants having amine inhibitor additive, even though the ultimate elongation decrease turns out to be somewhat greater because of the higher initial values.

Quite a considerable reduction in the quantity of the secondary amines dimethylamine, morpholine and dibutyl amine directly over the open vulcanization appliance that are released during vulcanization is reflected also in the reduction of the corresponding N-nitrosamines found in this area compared to the reference compound without amine inhibitor. The fact that residual amounts of free amines are still present in the press vapor can be due to the lack of purity of the commercially available amine inhibitors used here. An increase in the amount of inhibitor can reduce the quantities of free amines to below their analytical detection limit, as is still shown in the following Example 3.

Given an open storage of vulcanized rubber sheets at room temperature over a period of time of three weeks, in the case of Variant B1 a perceptible whitish-gray covering of blooms could be recognized on the surface. On the other hand, the samples B2 through B8 showed no or only slight traces of these blooms within this period of time.

Except for a few exceptions deviating slightly, in practically all cases the quantity of amines released from the vulcanized products to the surrounding air is found to be below the analytical detection limit of the determination method used. This means, for example, in the case of dimethylamine a reduction to <0.9% of the quantity emitted from the reference compound without amine inhibitor additive. A duplicate measuring of the sample B2 with the suction time extended by the factor 10 showed that even a reduction to a maximum of 0.09% (detection limit) is achieved.

Example 3

In the two previous examples, the amine inhibitors, depending on their (latent) isocyanate content, were dosed stoichiometrically to the maximum possible quantity of secondary amines from the vulcanization substances. In so doing, a reduction in the activity of the inhibitors, for example due to impurities in the case of industrial products or because of reaction with moisture from the surrounding air or the elastomeric compound during storage or compounding, was left unconsidered. Therefore in the present example, the dosage of two amine inhibitors is varied. In so doing, a deliberate underdosage was intentionally carried out such as can be technically relevant, for example, for cost reasons, as well as a clear overdosage which results in an increased rate of the inhibiting reaction.

For the measurements, the same master batch was used as in the Examples 1 and 2 with the vulcanization system B from Example 2. The variants B2/B11, as well as B6/B14 each have the same compound make-up, but were compounded at different points of time.

Figure 1A:
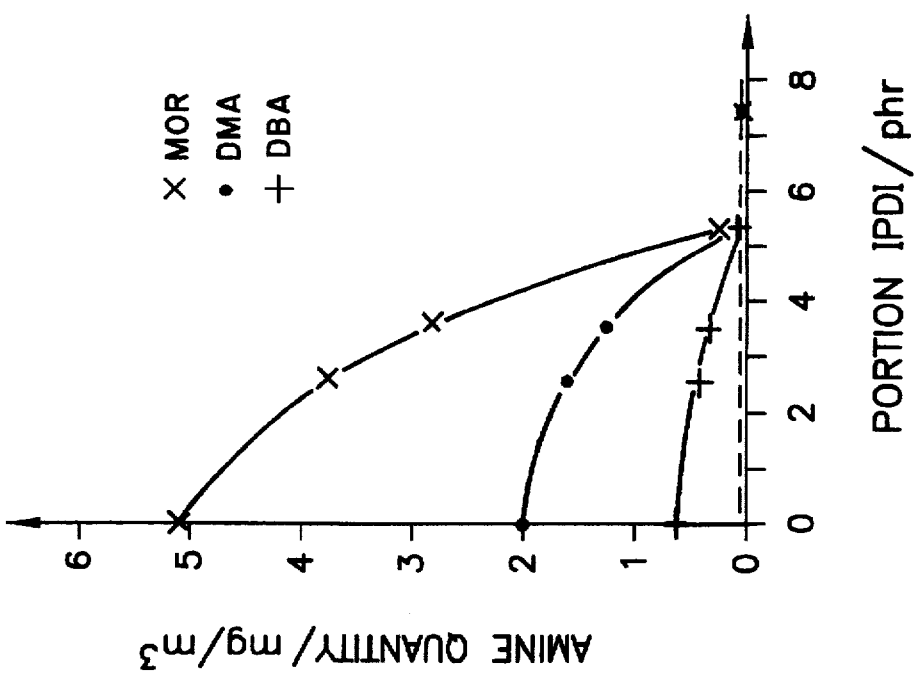
Figure 2B:
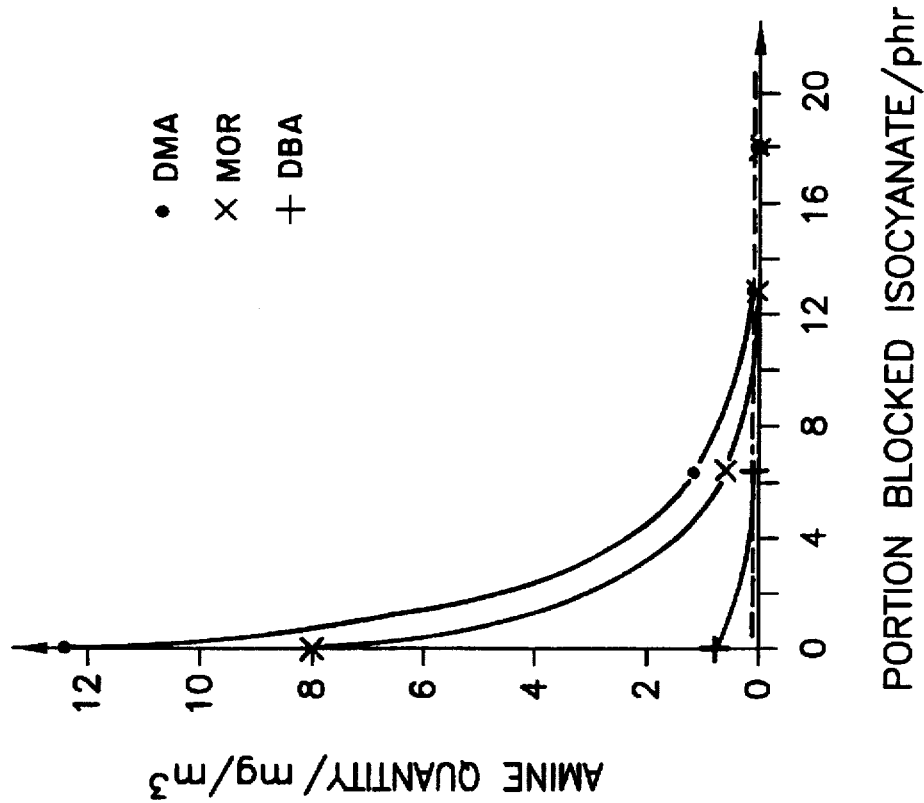
FIG. 2 illustrates the dependency of the quantities of amines, outgassing during the conducting of air over vulcanized product samples, on the quantity of amine inhibitor used analogous to FIG. 1 for Example 3.
Figure 2A:
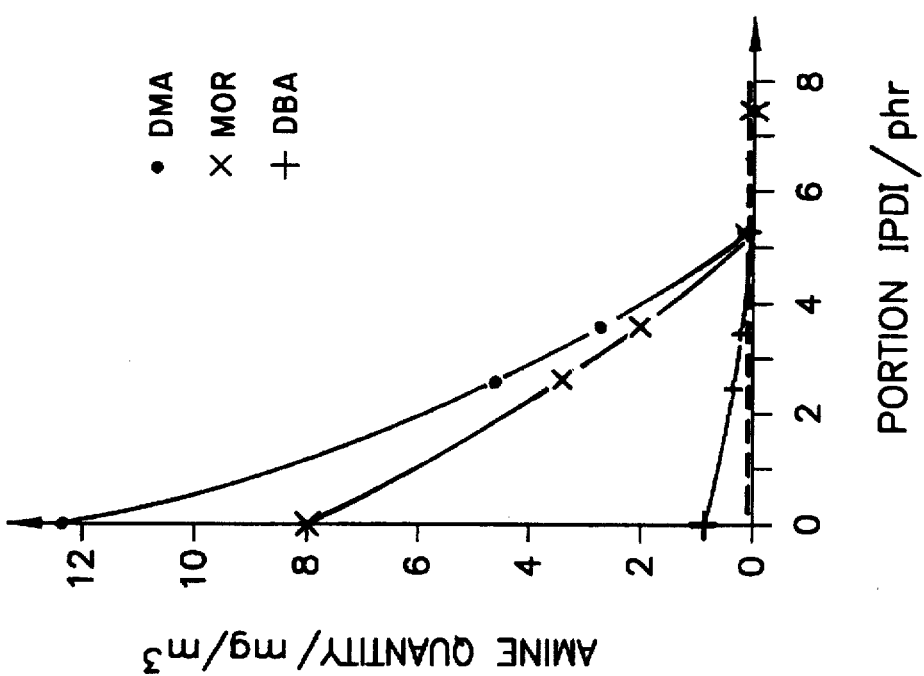

The following tables, as well as FIGS. 1 and 2 show the type and quantity of the amine inhibitors used and the measuring results obtained with the corresponding vulcanized products. For the mechanical-technological properties, the compression set and the storage in hot air, analogous quantity-dependent results were yielded as for the variants B2 and B6.

FIG. 1 shows the dependence of the quantities of free amines in the press vapor (testing method A 1) on the quantity of amine inhibitor used (IPDI or a corresponding blocked isocyanate). The dotted line indicates the detection limit (<0.1 mg/m$^3$).

FIG. 2 illustrates the dependency of the quantities of amines, outgassing during the conducting of air over vulcanized product samples (testing method A2), on the quantity of amine inhibitor used analogous to FIG. 1.

Compound Variants:

The values stated in parentheses indicate the relative portion of inhibitor in percentage, based on the dosage stoichiometric to the maximum possible amine quantities in variants B11 or B14. Quantity data in each case in phr.

| Amine Inhibitor | B1 | B9 | B10 | B11 (B2) | B12 | B13 | B14 (B6) | B15 |
|---|---|---|---|---|---|---|---|---|
| IPDI | — | 2.5 (48) | 3.5 (67) | 5.2 (100) | 7.5 (144) | — | — | — |
| Blocked isocyanate (having uretdione structures) (NCO content: 15.3%) | — | — | — | — | — | 6.4 (50) | 12.8 (100) | 18.0 (141) |

Free Amines in the Press Vapor (Testing Method A1)

Quantity data in mg amine/m$^3$; the values stated in parentheses indicate the relative portion (%) in comparison with the variant B1 (without amine inhibitor). Vulcanization conditions: 185° C./4 min. Because of the altered vulcanization conditions (doubled vulcanization time compared with the corresponding measurements in Example 2) and a somewhat changed positioning of the sampling tubes, one discovers lower amine concentrations for the variant without amine inhibitor additive.

| Amine | B1 | B9 | B10 | B11 (B2) | B12 | B13 | B14 (B6) | B15 |
|---|---|---|---|---|---|---|---|---|
| DMA | 1.99 | 1.61 (81) | 1.24 (62) | 0.13 (6.5) | <0.1 | 1.50 (65) | 0.10 (5.0) | <0.1 |
| MOR | 5.07 | 3.76 (74) | 2.85 (56) | 0.26 (5.1) | <0.1 | 2.99 (59) | 0.15 (2.9) | <0.1 |
| DBA | 0.64 | 0.43 (67) | 0.35 (55) | <0.1 | <0.1 | 0.42 (66) | <0.1 | <0.1 |

These measured values are depicted graphically in FIG. 1, the quantity of inhibitor used in each case being illustrated graphically on the abscissa, the quantities of free amines detected in the press vapor being illustrated graphically on the ordinate.

Amines Outgassing from the Vulcanized Product
(Testing Method A2)

Quantity data in mg amine/m³; the values stated in parentheses indicate the relative portion (%) in comparison with the Variant B1 (without amine inhibitor). Vulcanization conditions: 185° C./4 min.

| Amine | Variant | | | | | | | |
|---|---|---|---|---|---|---|---|---|
| | B1 | B9 | B10 | B11 (B2) | B12 | B13 | B14 (B6) | B15 |
| DMA | 12.33 | 4.61 (37) | 2.84 (23) | 0.25 (2.0) | <0.1 | 1.21 (9.8) | 0.12 (1.0) | <0.1 |
| MOR | 7.93 | 3.42 (43) | 2.10 (26) | 0.13 (1.6) | <0.1 | 0.69 (8.7) | <0.1 | <0.1 |
| DBA | 0.84 | 0.36 (42) | 0.20 (24) | <0.1 | <0.1 | 0.10 (12) | <0.1 | <0.1 |

These measured values are depicted graphically in FIG. 2, here the detected quantities of amines outgassing from the vulcanized product being illustrated graphically on the ordinate.

The following conclusions can be drawn from the measuring data and FIGS. 1 and 2:

- With increasing dosage of the amine inhibitor, both the quantities of free amines established in the press vapor and the quantities of amines emitted during the conducting of laboratory air over the vulcanized products diminish.
- In the case of approximately 50% inhibitor dosage (Variants B9 or B13), the quantities of free amines in the press vapor are less sharply reduced than the corresponding quantities of amines emitted to the overflowing air. An analogous finding is yielded for the stoichiometric dosage.
- In the case of the blocked isocyanate (B13), given an approximately 50% dosage, the reduction in the quantity of emitted amines is markedly greater than in the case of the non-blocked IPDI.
- In all cases, the hyperstoichiometric dosage yields a reduction in the secondary amines examined to below the detection limit of the analytical determination method used.
- The graphical depiction of the measuring results allows the conclusion that already an isocyanate (donor) dosage that is slightly (about 5%) increased compared to the stoichiometric dosage can reduce the detected amine quantities to below their analytical detection limit.

What is claimed is:

1. A method of inhibiting amine formation in an elastomeric compound comprising the step of incorporating into an elastomeric compound: a monofunctional or multifunctional isocyanate having the general formula $$R-(N=C=O)_x$$

where R is any organic radical and $x \geq 1$; or a compound which forms said isocyanate under the influence of increased temperature during vulcanization of the elastomeric compound, wherein said isocyanate is effective to inhibit amine formation during vulcanization of the elastomeric compound.

2. The method according to claim 1, wherein the isocyanate is a dimeric, oligomeric or polymeric isocyanate.

3. The method according to claim 2, wherein the isocyanate has a uretdione structure.

4. The method according to claim 1, further comprising the step of vulcanizing the elastomeric compound, wherein the isocyanate groups of the isocyanate or the groups which are converted to isocyanate groups of the compound which forms said isocyanate during vulcanization are stoichiometrically dosed essentially in correspondence with the amines which would be released under vulcanization conditions.

5. The method according to claim 1, further comprising the step of vulcanizing the elastomeric compound, wherein the isocyanate groups of the isocyanate or the groups which are converted to isocyanate groups of the compound which forms said isocyanate during vulcanization are hypostoichiometrically dosed essentially in correspondence with the amines which would be released under vulcanization conditions.

6. The method according to claim 1, further comprising the step of vulcanizing the elastomeric compound, wherein the isocyanate groups of the isocyanate or the groups which are converted to isocyanate groups of the compound which forms said isocyanate during vulcanization are hyperstoichiometrically dosed essentially in correspondence with the amines which would be released under vulcanization conditions.

7. The method according to claim 4, wherein the isocyanate is a dimeric, oligomeric or polymeric isocyanate.

8. The method according to claim 7, wherein the isocyanate has a uretdione structure.

9. The method according to claim 5, wherein the isocyanate is a dimeric, oligomeric or polymeric isocyanate.

10. The method according to claim 9, wherein the isocyanate has a uretdione structure.

11. The method according to claim 6, wherein the isocyanate is a dimeric, oligomeric or polymeric isocyanate.

12. The method according to claim 11, wherein the isocyanate has a uretdione structure.

* * * * *